United States Patent
Imazawa et al.

(10) Patent No.: US 11,982,784 B2
(45) Date of Patent: May 14, 2024

(54) FOREIGN OBJECT DETECTOR

(71) Applicant: OMRON Corporation, Kyoto (JP)

(72) Inventors: Takanori Imazawa, Kyoto (JP); Goro Nakao, Kyoto (JP)

(73) Assignee: OMRON Corporation, Kyoto (JP)

(*) Notice: Subject to any disclaimer, the term of this patent is extended or adjusted under 35 U.S.C. 154(b) by 131 days.

(21) Appl. No.: 17/800,560

(22) PCT Filed: Jan. 20, 2021

(86) PCT No.: PCT/JP2021/001850
§ 371 (c)(1),
(2) Date: Aug. 18, 2022

(87) PCT Pub. No.: WO2021/192552
PCT Pub. Date: Sep. 30, 2021

(65) Prior Publication Data
US 2023/0094624 A1 Mar. 30, 2023

(30) Foreign Application Priority Data
Mar. 26, 2020 (JP) ................. 2020-056587

(51) Int. Cl.
*G01V 3/10* (2006.01)
(52) U.S. Cl.
CPC .................... *G01V 3/105* (2013.01)
(58) Field of Classification Search
CPC ..................................... G01V 3/105
See application file for complete search history.

(56) References Cited

U.S. PATENT DOCUMENTS

| 9,178,361 | B2* | 11/2015 | Liu | H02J 50/12 |
| 10,608,473 | B2* | 3/2020 | Tsukiyama | H02J 50/12 |
| 11,146,121 | B2* | 10/2021 | Nakao | H02J 50/12 |

(Continued)

FOREIGN PATENT DOCUMENTS

| JP | 2015-128363 A | 7/2015 |
| JP | 2018-207764 A | 12/2018 |

(Continued)

OTHER PUBLICATIONS

English translation of the International Search Report ("ISR") of PCT/JP2021/001850 dated Apr. 13, 2021.
Written Opinion("WO") of PCT/JP2021/001850 dated Apr. 13, 2021.

*Primary Examiner* — Reena Aurora
(74) *Attorney, Agent, or Firm* — METROLEX IP LAW GROUP, PLLC

(57) ABSTRACT

A foreign object detector includes detection coils between a transmitter coil in a transmitter device and a receiver coil in a receiver device, a power supply circuit that supplies AC power having a predetermined frequency to each detection coil through a feeder coil located to be electromagnetically coupled to each detection coil, and a detection circuit that detects, while power to be transmitted to the receiver coil is being supplied to the transmitter coil, a criteria voltage to be a criterion for foreign object detection output from each detection coil at a start of power supply from the power supply circuit and outputs a signal to stop power supply to the transmitter coil in response to the criteria voltage for any detection coil deviating from a predetermined range. The transmitter device transmits power to the receiver device contactlessly.

1 Claim, 8 Drawing Sheets

(56) References Cited

U.S. PATENT DOCUMENTS

| | | |
|---|---|---|
| 11,422,281 B2 * | 8/2022 | Nakao ................... H02J 50/12 |
| 2015/0145529 A1 | 5/2015 | Urano |
| 2016/0241064 A1 | 8/2016 | Hatakeyama et al. |
| 2016/0261130 A1 | 9/2016 | Seki et al. |
| 2021/0143676 A1 | 5/2021 | Nakao et al. |

FOREIGN PATENT DOCUMENTS

| | | |
|---|---|---|
| WO | 2014/156655 A1 | 10/2014 |
| WO | 2015/064102 A1 | 5/2015 |

* cited by examiner

FOREIGN OBJECT DETECTOR

FIELD

The present disclosure relates to a foreign object detector that detects foreign objects in a power transmission system in which electric power is transmitted contactlessly.

BACKGROUND

Techniques have been studied for contactless power transmission (also referred to as wireless power transmission) or transmitting electric power through space without using metal contacts or other connections. One known technique of contactless power transmission uses electromagnetic induction to transmit power. Power transmission by electromagnetic induction uses electromagnetic coupling between a primary (transmission end or feeding end) coil (hereafter, transmitter coil) and a secondary (receiving end) coil (hereafter, receiver coil) to transmit power from the transmitter coil to the receiver coil.

In a power transmission system using such a contactless power transmission technique, a foreign object such as a metal object can be between the transmitter coil and the receiver coil. In this case, the foreign object may be inductively heated and ignite during power transmission, or the device may fail due to the heat generated by the foreign object. In such a power transmission system, the relative positional relationship between the transmitter coil and the receiver coil may change during power transmission, thus changing the degree of coupling between the transmitter coil and the receiver coil. A technique has been developed to present failure resulting from a foreign object between the transmitter coil and the receiver coil, although their coupling degree is changeable (refer to, for example, Patent Literature 1). With the technique, a contactless power transmission apparatus determines that a foreign object is between the transmitter coil in its transmitter device and the receiver coil in its receiver device when the contactless power transmission apparatus does not operate at a constant voltage output at any frequency of the alternating current (AC) power supplied to the transmitter coil that is varied over a predetermined frequency range.

CITATION LIST

Patent Literature

Patent Literature 1: Japanese Unexamined Patent Application Publication No. 2018-207764

A small foreign object between the transmitter coil and the receiver coil may not change the characteristics of the power transmission from the transmitter device to the receiver device and may be undetectable.

One or more embodiments are directed to a foreign object detector with improved detection accuracy of foreign objects between the transmitter coil in the transmitter device and the receiver coil in the receiver device.

The foreign object detector according to one or more embodiments includes a plurality of detection coils at different positions between a transmitter coil in a transmitter device and a receiver coil in a receiver device, a plurality of capacitors each forming a resonant circuit together with a corresponding detection coil of the plurality of detection coils, a feeder coil located to be electromagnetically coupled to each of the plurality of detection coils, a power supply circuit that supplies alternating current power having a predetermined frequency to each of the plurality of detection coils through the feeder coil, and a detection circuit that detects a voltage output from each of the plurality of detection coils in response to the supplied alternating current power and detects a foreign object between the transmitter coil and the receiver coil based on the detected voltage. The transmitter device transmits power to the receiver device contactlessly. The detection circuit includes a storage that stores a criterial voltage for each of the plurality of detection coils, a controller that detects, while power to be transmitted to the receiver coil in the receiver device is being supplied to the transmitter coil, the criterial voltage output from each of the plurality of detection coils at a start of supply of the alternating current power having the predetermined frequency from the power supply circuit, outputs a signal to stop power supply to the transmitter coil in response to the criterial voltage for at least one detection coil of the plurality of detection coils deviating from a predetermined range, and stores the criterial voltage for each of the plurality of detection coils into the storage in response to the criterial voltage for each of the plurality of detection coils being within the predetermined range, and a determiner that determines that a foreign object is between the transmitter coil and the receiver coil in response to a ratio of the detected voltage for at least one detection coil of the plurality of detection coils to the criterial voltage for the at least one detection coil deviating from a predetermined allowable voltage change ratio.

The foreign object detector according to one or more embodiments with the structure may have improved detection accuracy of foreign objects between the transmitter coil in the transmitter device and the receiver coil in the receiver device. The foreign object detector may prevent the criterial voltage from being set inappropriately when a foreign object is already between the transmitter coil and the receiver coil in setting the criterial voltage, thus preventing failure to detect any foreign object being present.

DETAILED DESCRIPTION

A foreign object detector according to one embodiment of the present invention will now be described with reference to the drawings. The foreign object detector includes a substrate to be placed between a transmitter coil in a device on a power transmission end (hereafter simply referred to as a transmitter device) and a receiver coil in a device on a power receiving end (hereafter simply referred to as a receiver device). The transmitter device and the receiver device are included in a power transmission system in which electric power is transmitted contactlessly. The foreign object detector includes, on the substrate, a feeder coil to supply power for foreign object detection and multiple detection coils each smaller than the feeder coil. The detection coils are at different positions inside the feeder coil and can be electromagnetically coupled to the feeder coil. Each of the detection coils can resonate at a frequency different from the frequency of the power supplied to the transmitter coil in the transmitter device. The frequency at which each detection coil can resonate is also a frequency at which neither the resonant circuit including the transmitter coil (for the transmitter device including any resonant circuit) nor the resonant circuit including the receiver coil resonates. The foreign object detector supplies the feeder coil with alternating current (AC) power having a frequency at which the detection coils resonate and detects the voltage output from each of the detection coils. Any conductive foreign object such as a metal object between the transmitter coil and the receiver coil changes the resonance characteristics of any of the detection coils, thus changing the detected voltage. The foreign object detector thus monitors the detected voltage and determines that a foreign object is between the transmitter coil and the receiver coil in response to the detected voltage deviating from a predetermined criteria range for determining that no foreign object is present. The foreign object detector sets, in a calibration process, a voltage to be a criterion (hereafter simply referred to as a criteria voltage) to determine the presence of any foreign object for each detection coil based on the voltage output from each detection coil in response to power supplied to the feeder coil. The foreign object detector sets, as a criteria range, an allowable ratio of voltage change for the ratio of the detected voltage to the criteria voltage to reduce erroneous detection of a foreign object due to the difference in the positional relationship between each detection coil and the feeder coil. In the calibration process, the foreign object detector stops setting the criteria voltage in response to the voltage output from any of the detection coils deviating from a predetermined initial setting range, and stops supplying power to the transmitter coil in the transmitter device.

Figure 1:
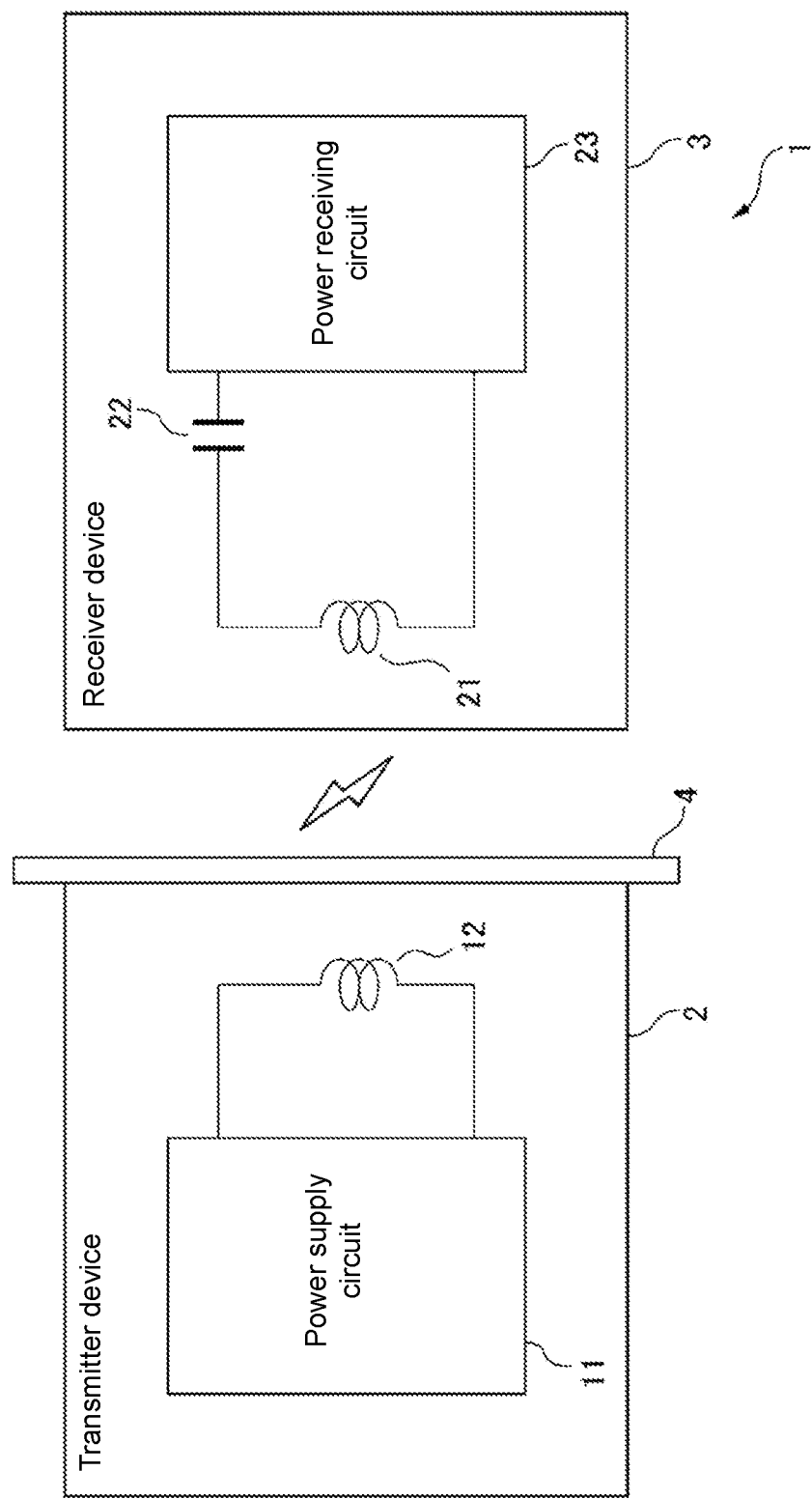
FIG. 1 is a schematic diagram illustrating a power transmission system including a foreign object detector according to one or more embodiments.

FIG. 1 is a schematic diagram of the power transmission system including the foreign object detector according to one embodiment of the present invention. As shown in FIG. 1, a power transmission system 1 includes a transmitter device 2, a receiver device 3, and a foreign object detector 4. The transmitter device 2 and the receiver device 3 are included in a contactless power transmission apparatus, in which the transmitter device 2 transmits electric power to the receiver device 3 contactlessly through space. The transmitter device 2 includes a power supply circuit 11 and a transmitter coil 12. The receiver device 3 includes a receiver coil 21, a resonant capacitor 22, and a power receiving circuit 23. The power transmission system 1 can be, for example, a contactless power transmission apparatus including primary series-secondary series resonant capacitor (SS) configuration or primary series-secondary parallel resonant capacitor (SP) configuration. In another example, the power transmission system 1 may be a contactless power transmission apparatus that does not use the resonance at the primary end but uses the series resonance between the receiver coil and the resonant capacitor at the secondary end (NS configuration) or a contactless power transmission apparatus that does not use the resonance at the primary end but uses the parallel resonance between the receiver coil and the resonant capacitor at the secondary end (NP configuration).

The transmitter device 2 will now be described.

The power supply circuit 11 supplies AC power to the transmitter coil 12. The power supply circuit 11 includes, for example, a direct current (DC) power supply that supplies DC power, an inverter circuit that converts the DC power supplied from the DC power supply to AC power to supply the AC power to the transmitter coil 12, and a control circuit that controls the inverter circuit. The inverter circuit may be a full-bridge inverter with four switching elements (e.g., metal-oxide-semiconductor field-effect transistors or MOSFETs) forming a full-bridge connection or a half-bridge inverter with two switching elements forming a half-bridge connection. The control circuit controls on-off switching of each switching element in the inverter circuit to cause the AC power supplied to the transmitter coil 12 to be at a predetermined frequency (e.g., the frequency at which the resonant circuit in the receiver device 3 resonates). The control circuit also outputs, in response to power supply started from the power supply circuit 11 to the transmitter coil 12, a signal indicating the start of the power supply to the foreign object detector 4. The control circuit also stops, in response to a control signal from the foreign object detector 4 indicating that power supply to the transmitter coil 12 is to be stopped or a signal indicating detection of a foreign object, supplying power to the transmitter coil 12 from the power supply circuit 11 by retaining the off-state of each switching element in the inverter circuit. The power supply circuit 11 may further include a DC-DC converter between the DC power supply and the inverter circuit. In another example, instead of the DC power supply, the power supply circuit 11 may include a rectifier circuit that is connected to an AC power supply and rectifies AC power from the AC power supply and a power factor correction circuit that is connected to the rectifier circuit and converts pulsed current power output from the rectifier circuit to DC power. In this case, the control circuit may control, for example, the power factor correction circuit to adjust the voltage of the DC power supplied to the inverter circuit to retain a constant voltage of power received by the receiver device 3.

The transmitter coil 12 transmits, through space, AC power supplied from the power supply circuit 11 to the receiver coil 21 in the receiver device 3. The transmitter device 2 may include a capacitor connected in series with the transmitter coil 12 between the transmitter coil 12 and the inverter circuit in the power supply circuit 11. The capacitor may be used to cut DC power or to form a resonant circuit that resonates with the transmitter coil 12 at the frequency of the AC power supplied to the transmitter coil 12.

The transmitter device 2 may further include a communicator that receives a signal indicating the status of power reception at the receiver device 3. In this case, the control circuit in the power supply circuit 11 may change, in accordance with power reception status, the on-off switching timing of each switching element included in the inverter circuit to change the frequency of the AC power supplied to the transmitter coil 12.

The control circuit in the power supply circuit 11 may turn off each switching element included in the inverter circuit to stop power supply from the power supply circuit 11 to the transmitter coil 12 in response to a signal from the foreign object detector 4 indicating detection of a foreign object between the transmitter coil 12 and the receiver coil 21.

The receiver device 3 will now be described.

The receiver coil 21 forms a resonant circuit with the resonant capacitor 22. The receiver coil 21 resonates with the AC flowing through the transmitter coil 12 in the transmitter device 2 to receive power from the transmitter coil 12. The resonant capacitor 22 may thus be connected in series or in parallel with the receiver coil 21. The resonant circuit including the receiver coil 21 and the resonant capacitor 22 outputs AC power, which is output to the power receiving circuit 23. The receiver coil 21 and the transmitter coil 12 may have the same number or different numbers of turns.

The power receiving circuit 23 converts the AC power from the resonant circuit including the receiver coil 21 and resonant capacitor 22 to DC power and outputs the DC power to a load circuit (not shown) connected to the power receiving circuit 23. The power receiving circuit 23 includes, for example, a full-wave rectifier circuit that converts the AC power from the resonant circuit to pulsed current power and a smoothing capacitor that smooths the pulsed current power output from the full-wave rectifier circuit and outputs the smoothed pulsed current power to the load circuit. The power receiving circuit 23 may further include a voltmeter for measuring the voltage output to the load circuit, a communicator for transmitting a signal indicating the power reception status, such as the voltage measured by the voltmeter, to the transmitter device 2, a switching element for switching on or off the connection of the power receiving circuit 23 with the load circuit, and a control circuit for on-off control of the switching element.

The foreign object detector 4 according to the present embodiment will now be described. The foreign object detector 4 is to be placed between the transmitter coil 12 and receiver coil 21 that are in a positional relationship in which the transmitter device 2 can transmit power to the receiver device 3, or more specifically, in which the transmitter coil 12 and the receiver coil 21 can be electromagnetically coupled to each other. The foreign object detector 4 detects any conductive foreign object, such as a metal object, between the transmitter coil 12 and the receiver coil 21.

Figure 2:
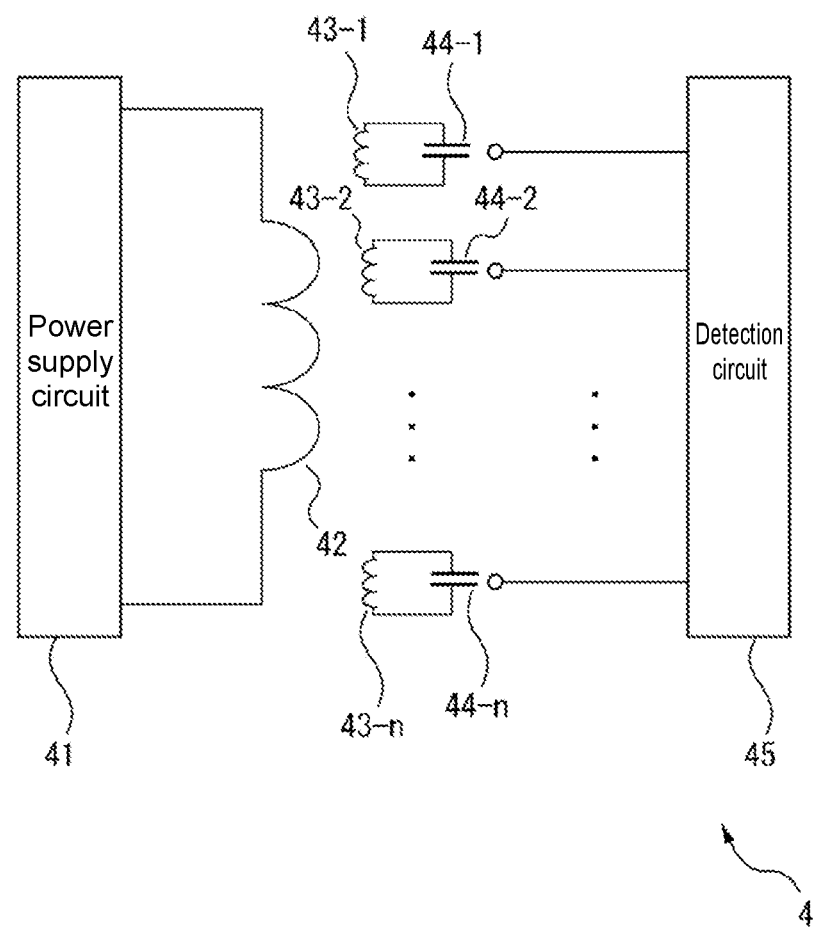
FIG. 2 is a schematic diagram illustrating a foreign object detector.
Figure 3:
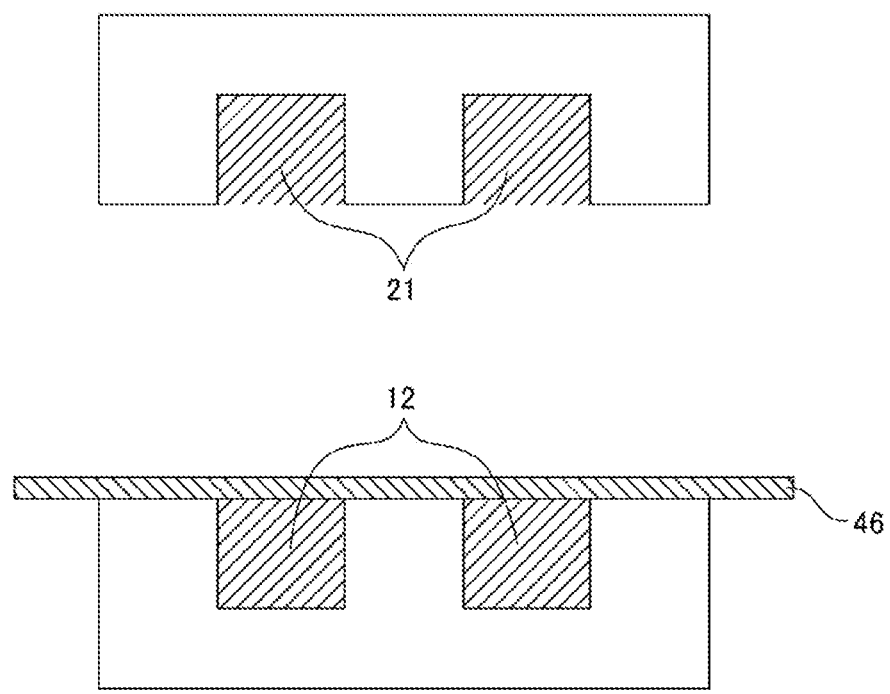
FIG. 3 is a schematic diagram illustrating a side cross-sectional view of a transmitter coil and a substrate on which a foreign object detector is mounted, showing an example positional relationship.
Figure 4:
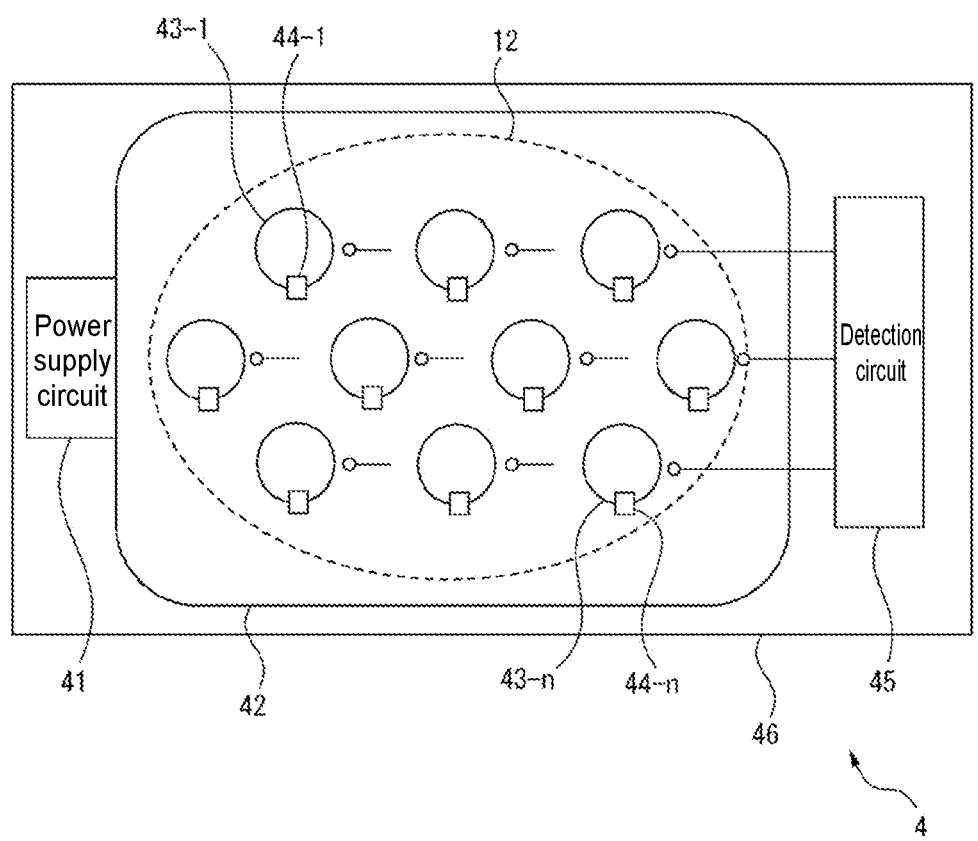
FIG. 4 is a diagram illustrating a schematic plan view of multiple detection coils and a feeder coil included in a foreign object detector, showing an example arrangement.

FIG. 2 is a schematic diagram of the foreign object detector 4. FIG. 3 is a schematic side cross-sectional view of the transmitter coil 12 and a substrate on which the foreign object detector 4 is mounted, showing their example positional relationship. FIG. 4 is a schematic plan view of the multiple detection coils and the feeder coil included in the foreign object detector 4, showing their example arrangement.

As shown in FIG. 2, the foreign object detector 4 includes a power supply circuit 41, a feeder coil 42, multiple detection coils 43-1 to 43-$n$ (n is an integer greater than or equal to 2), multiple capacitors 44-1 to 44-$n$, and a detection circuit 45. The power supply circuit 41, the feeder coil 42, the detection coils 43-1 to 43-$n$, the capacitors 44-1 to 44-$n$, and the detection circuit 45 are mounted on a substrate 46 to be placed between the transmitter coil 12 and the receiver coil 21 that are in a positional relationship in which the transmitter coil 12 and the receiver coil 21 can be electromagnetically coupled to each other. In the present embodiment, the substrate 46 is attached to the transmitter device 2. The detection circuit 45 outputs a signal indicating the detection result of any foreign object to the power supply circuit 11 in the transmitter device 2.

Figure 5:
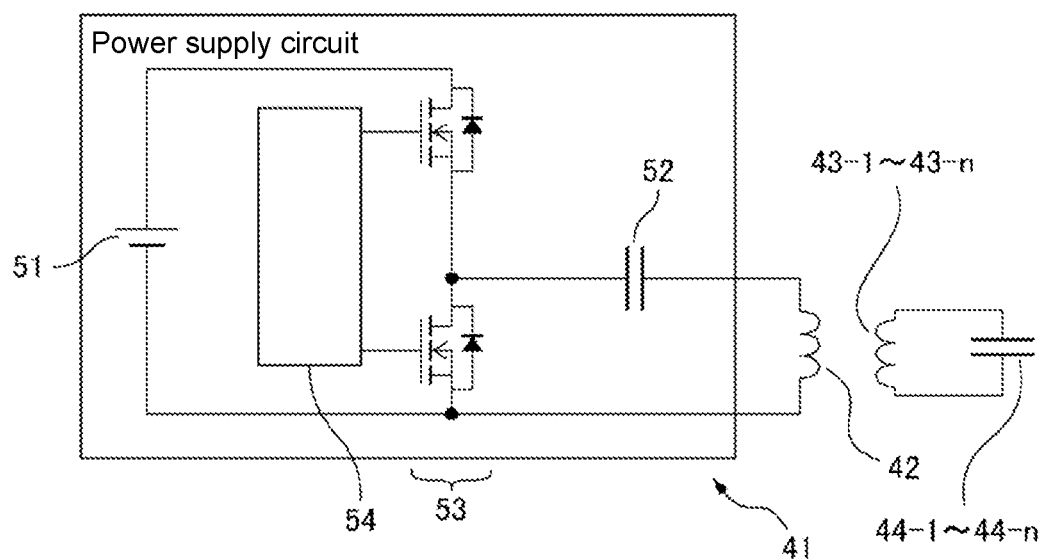
FIG. 5 is a circuit diagram illustrating an example power supply circuit.

FIG. 5 is a circuit diagram of an example of the power supply circuit 41. The power supply circuit 41 includes, for example, a DC power supply 51 that supplies DC power, a capacitor 52, an inverter circuit 53, and a control circuit 54 that controls the inverter circuit 53. The power supply circuit 41 supplies power for foreign object detection to each of the detection coils 43-1 to 43-$n$ through the feeder coil 42.

The feeder coil 42 has one end connected to the inverter circuit 53 through the capacitor 52 and the other end grounded. The feeder coil 42 and the capacitor 52 may be connected in a reversed order.

The inverter circuit 53 converts the DC power supplied from the DC power supply 51 to AC power and supplies the AC power to the feeder coil 42. Although the inverter circuit 53 is a half-bridge inverter with two switching elements (e.g., MOSFETs) forming a half-bridge connection in this example, the inverter circuit 53 may include a full-bridge inverter with four switching elements forming a full-bridge connection. The control circuit 54 controls on-off switching of each switching element included in the inverter circuit to cause the AC power supplied to the feeder coil 42 to be at a predetermined frequency.

The AC power supplied from the power supply circuit 41 to each of the detection coils 43-1 to 43-$n$ through the feeder coil 42 may have a frequency different from the frequency of the AC power supplied to the transmitter coil 12 in the transmitter device 2. The frequency may also be a frequency at which neither the resonant circuit including the transmitter coil 12 (for the transmitter device 2 including any resonant circuit) nor the resonant circuit including the receiver coil 21 resonates. For example, the frequency of the AC power supplied from the power supply circuit 41 may be higher than the frequency of the AC power supplied to the transmitter coil 12 (e.g., 85 kHz or 150 kHz) and may be, for example, 13.56 MHz, 27.12 MHz, or 40.68 MHz, which are in the industrial, scientific, and medical (ISM) radio bands. This prevents the AC power supplied from the power supply circuit 41 from affecting power transmission from the transmitter device 2 to the receiver device 3. The frequency of the AC power supplied from the power supply circuit 41 set in the above manner can relatively reduce the inductance of each of the detection coils 43-1 to 43-$n$ included in the foreign object detector 4. This easily allows each detection coil to be smaller than the transmitter coil 12.

Referring back to FIGS. 3 and 4, the feeder coil 42 and the detection coils 43-1 to 43-$n$ (n=10 in FIG. 4) each are a wiring pattern located on the substrate 46 and formed from a conductive material such as metal. Each detection coil 43-$i$ is connected to the corresponding capacitor 44-$i$ ($i=1, 2, \ldots, n$) to form one resonant circuit. The inductance of each detection coil and the capacitance of each capacitor may be set to avoid resonance of the resonant circuit including the detection coil and the capacitor at the frequency of the AC power supplied to the transmitter coil 12. Each resonant circuit in the foreign object detector 4 thus does not resonate with the AC power transmitted from the transmitter device 2 to the receiver device 3. The foreign object detector 4 can thus prevent the AC power transmitted from the transmitter device 2 to the receiver device 3 from affecting the detection of any foreign object. The inductance of each detection coil and the capacitance of each capacitor may be set to cause the resonant circuit including the detection coil and the capacitor to resonate at the frequency of the AC power supplied from the power supply circuit 41 through the feeder coil 42. This reduces the loss of AC power supplied from the power supply circuit 41 through the feeder coil 42 before the AC power reaches the detection circuit 45. The foreign object detector 4 can thus avoid decreasing in the detection accuracy of foreign objects. Each resonant circuit may have a resonant frequency different from the frequency of the AC power supplied from the power supply circuit 41 when the voltage corresponding to the AC power supplied from the power supply circuit 41 is output from each detection coil to the detection circuit 45.

The substrate 46 is located to have the direction of its normal substantially parallel to the central axis of the transmitter coil 12. The outer diameter of the feeder coil 42 may be, as viewed in the normal direction of the substrate 46, or more specifically, in the direction of the central axis of the transmitter coil 12, greater than or about the same as the profile of the transmitter coil 12. The transmitter coil 12 may be located inside the feeder coil 42 as viewed in the normal direction of the substrate 46. Each of the detection coils 43-1 to 43-*n* is smaller than the feeder coil 42 and is located to be electromagnetically coupled to the feeder coil 42 at different positions inside the feeder coil 42 as viewed in the normal direction of the substrate 46. This allows the feeder coil 42 to reliably supply power for foreign object detection to each detection coil. Each detection coil thus resonates, together with the corresponding capacitor, with the AC power supplied from the power supply circuit 41 through the feeder coil 42 to output the voltage for the AC power to the detection circuit 45. When each of the detection coils can receive power from the feeder coil 42, one or more of the detection coils may be located outside the feeder coil 42 or may overlap the feeder coil 42 as viewed in the normal direction of the substrate 46.

Although the detection coils are staggered in the example shown in FIG. 4, the detection coils may be arranged in other manners, such as in a grid. The spacing between two adjacent detection coils may differ from the spacing between another pair of adjacent detection coils. In another example, the detection coils may be equally spaced from one another.

Each of the detection coils 43-1 to 43-*n* may be electromagnetically coupled to one another, or may not be electromagnetically coupled to one another without the feeder coil 42. The detection coils may be spaced from one another to avoid being electromagnetically coupled to one another. In this case, the voltage output from each detection coil to the detection circuit 45 has negligible effects on other detection coils. This allows a detection coil, of the detection coils, near any foreign object to output a voltage to the detection circuit 45 that fluctuates more in response to the foreign object. Thus, the foreign object detector 4 including the detection coils spaced from one another to avoid being electromagnetically coupled to one another can have improved detection accuracy of foreign objects.

In another example, the detection coils may be close to one another to be electromagnetically coupled to one another. In this case, each detection coil is at a shorter distance to the detection coil that is closest to any foreign object. This increases, for any foreign object, the fluctuations in the voltage output from any of the detection coils to the detection circuit 45. Thus, the foreign object detector 4 including the detection coils close to one another to be electromagnetically coupled to one another can also have improved detection accuracy of foreign objects.

In the example of FIG. 4, the feeder coil 42 and the detection coils 43-1 to 43-*n* are located on the same surface of the substrate 46. In another example, the feeder coil 42 and the detection coils 43-1 to 43-*n* may be located on different surfaces of the substrate 46. In still another example, some of the detection coils 43-1 to 43-*n* may be located on the same surface as the feeder coil 42, and the others of the detection coils 43-1 to 43-*n* may be located on a surface different from the surface on which the feeder coil 42 is located.

Although each of the detection coils 43-1 to 43-*n* is substantially circular in the example shown in FIG. 4, the detection coils may be, for example, elliptical or rectangular, rather than circular. The shape and size of each of the detection coils 43-1 to 43-*n* may be the same or different from each other. Each of the detection coils 43-1 to 43-*n* may be smaller than the transmitter coil 12 as viewed in the central axial direction of the transmitter coil 12. A foreign object smaller than the transmitter coil 12 between the transmitter coil 12 and the receiver coil 21 thus readily affects any of the detection coils 43-1 to 43-*n*, allowing the foreign object detector 4 to accurately detect such a small object.

The detection circuit 45 detects the voltage of AC power output from each of the detection coils 43-1 to 43-*n* and detects any foreign object between the transmitter coil 12 and the receiver coil 21 based on the detected voltage.

In the present embodiment, the AC power transmitted from the transmitter device 2 to the receiver device 3 does not affect transmission of AC power from the power supply circuit 41 to the detection circuit 45 through the feeder coil 42 and any of the detection coils 43-1 to 43-*n*. Any foreign object between the transmitter coil 12 and the receiver coil 21 changes the resonance characteristics of a detection coil, of the detection coils 43-1 to 43-*n*, near the foreign object. The foreign object thus affects transmission of AC power from the power supply circuit 41 to the detection circuit 45 through the detection coil near the foreign object. This causes a change in the voltage that is output from the detection coil near the foreign object and is detected by the detection circuit 45. For example, when a metal object is near a detection coil carrying a current resulting from supplied AC power, the magnetic flux generated near the detection coil by the current induces eddy currents in the metal object and thus causes loss. The magnetic flux generated by the eddy currents reduces the inductance of the detection coil. In particular, a magnetic metal object may cause a smaller change in inductance but may cause relatively great loss. This changes the resonance characteristics of the resonant circuit including the detection coil. The detection circuit 45 thus determines for each of the detection coils 43-1 to 43-*n* whether the voltage output from the detection coil is within a predetermined criteria range, and determines that a foreign object is between the transmitter coil 12 and receiver coil 21 in response to the voltage deviating from the predetermined criteria range. In the present embodiment, the predetermined criteria range is set for each detection coil. The predetermined criteria range will be described in detail later.

Figure 6:
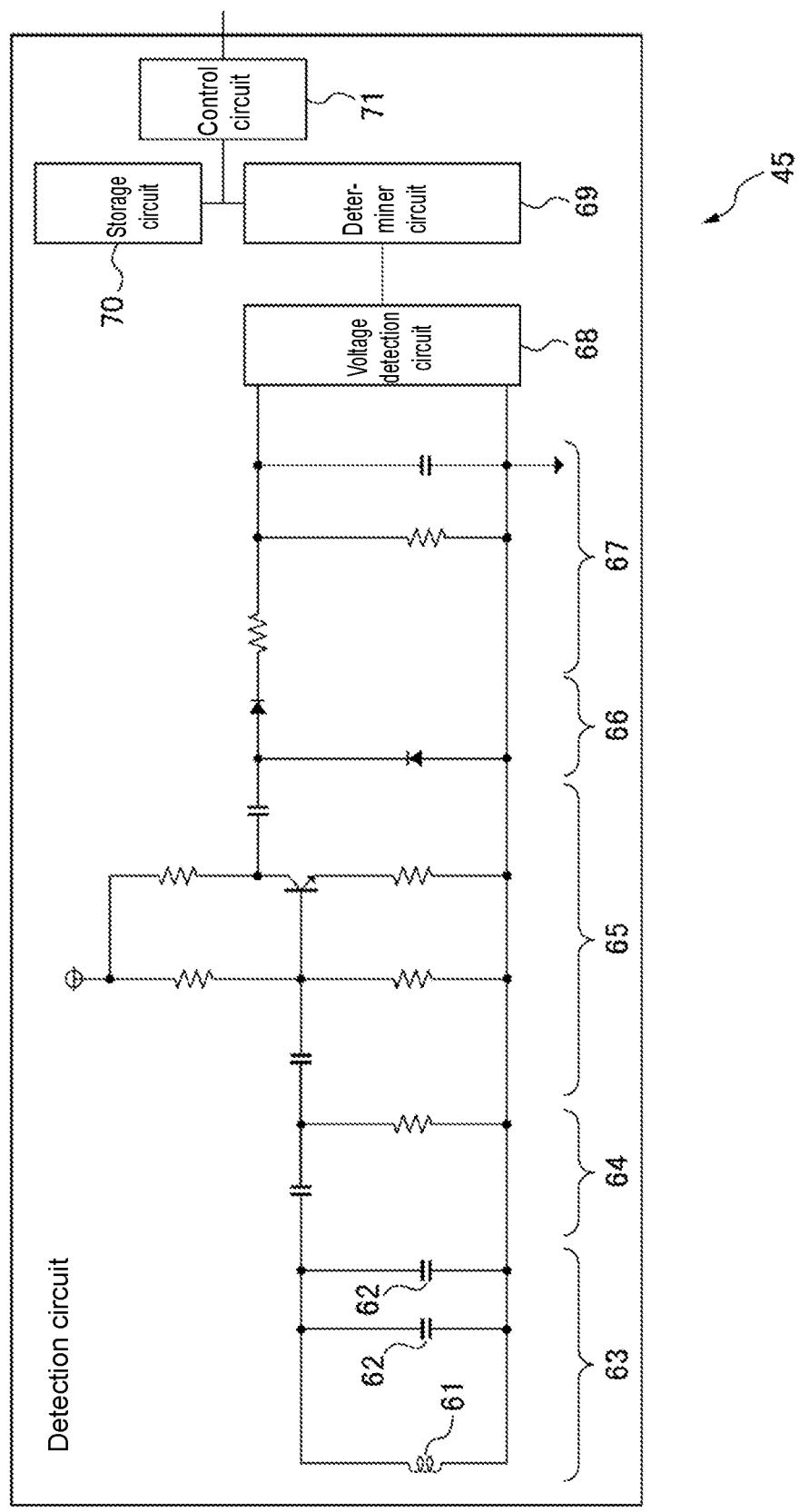
FIG. 6 is a circuit diagram illustrating an example detection circuit.

FIG. 6 is a circuit diagram of an example of the detection circuit 45. The detection circuit 45 includes a resonant circuit 63 including a receiver coil 61 and resonant capacitors 62, a high-pass filter 64, an amplifier 65, a half-wave rectifier circuit 66, a low-pass filter 67, a voltage detection circuit 68, a determiner circuit 69, a storage circuit 70, and a control circuit 71. Other than the configuration shown in FIG. 6, the detection circuit 45 may have any circuit configuration that allows detection of the voltage of AC power transmitted from each detection coil and determination as to whether the detected voltage deviates from the predetermined criteria range.

The configuration of the detection circuit 45 can be the same for each detection coil, and thus FIG. 6 shows the configuration of the detection circuit 45 for one detection coil. The detection circuit 45 may include a single determiner circuit 69, a single storage circuit 70, and a single control circuit 71 commonly used by each of the detection coils 43-1 to 43-n. The determiner circuit 69, the storage circuit 70, and control circuit 71 may be separate circuits, or any two or all of the determiner circuit 69, the storage circuit 70, and the control circuit 71 may be included in a single integrated circuit.

The resonant circuit 63 detects AC power supplied from the power supply circuit 41 and transmitted through the feeder coil 42 and the corresponding detection coil of the detection coils 43-1 to 43-n. The receiver coil 61 in the resonant circuit 63 is thus located to be electromagnetically coupled to the corresponding detection coil of the detection coils 43-1 to 43-n. The inductance of the receiver coil 61 and the capacitance of the resonant capacitors 62 are set to cause the resonant circuit 63 to resonate with the AC power supplied from the power supply circuit 41. Although two resonant capacitors 62 are connected in parallel with the receiver coil 61 in FIG. 6, the resonant circuit 63 may include one resonant capacitor 62 or three or more resonant capacitors 62, other than the two resonant capacitors 62. The receiver coil 61 and the resonant capacitor 62 may be connected in series.

The high-pass filter 64 is connected between the resonant circuit 63 and the amplifier 65 to attenuate noise components with a frequency below the frequency of the AC power supplied from the power supply circuit 41, of the AC power received by resonant circuit 63. The amplifier 65 is connected between the high-pass filter 64 and the half-wave rectifier circuit 66 to amplify the AC power output from the high-pass filter 64.

The half-wave rectifier circuit 66 is connected between the amplifier 65 and the low-pass filter 67 to convert the amplified AC power output from amplifier 65 to pulsed current power by half-wave rectification. The low-pass filter 67 is connected between the half-wave rectifier circuit 66 and the voltage detection circuit 68 to smooth the pulsed current power output from the half-wave rectifier circuit 66 and convert the smoothed power to DC power.

The voltage detection circuit 68 is connected to the low-pass filter 67 to detect the voltage of the DC power output from the low-pass filter 67. The voltage detection circuit 68 then outputs the detected voltage to the determiner circuit 69. The voltage detection circuit 68 may be any voltage detection circuit that can detect a DC voltage.

The determiner circuit 69 is an example of a determiner, which includes a converter circuit that converts the voltage received from the voltage detection circuit 68 to a signal value and an arithmetic circuit that determines whether the signal value is within the predetermined criteria range. The determiner circuit 69 determines, in a foreign object detection process, whether the voltage detected for each detection coil is within the predetermined criteria range. In response to the detected voltages for all the detection coils being within the predetermined criteria range, the determiner circuit 69 determines that no foreign object is between the transmitter coil 12 and the receiver coil 21. In response to the detected voltage for any of the detection coils deviating from the predetermined criteria range, the determiner circuit 69 determines that a foreign object is between the transmitter coil 12 and the receiver coil 21. The determiner circuit 69 then outputs a signal indicating the detection result of a foreign object to the power supply circuit 11 in the transmitter device 2 through the control circuit 71.

In the present embodiment, the detection coils 43-1 to 43-n have their respective criteria voltages. A range of voltage values obtained by multiplying each criteria voltage by a preset allowable ratio (e.g., 0.8 to 1.2) of voltage change is set as the predetermined criteria range. In other words, each detection coil has a different predetermined criteria range. In this manner, the predetermined criteria ranges are set appropriately for the respective detection coils that each have a different degree of coupling to the feeder coil 42. In this example, the predetermined criteria range includes both the lower and upper limits of the voltage used for determining no presence of foreign objects. In another example, the predetermined criteria range may include the lower limit alone or the upper limit alone of the voltage used for determining no presence of foreign objects.

The determiner circuit 69 determines that no foreign object is detected in response to voltage change ratios for all the detection coils being within the allowable voltage change ratio. The voltage change ratio refers to the ratio of the voltage, to the criteria voltage, output from each detection coil in the foreign object detection process performed by the foreign object detector 4. In response to the voltage change ratio for any of the detection coils deviating from the allowable voltage change ratio, the determiner circuit 69 determines that a foreign object is detected.

The storage circuit 70 is an example of a storage, which includes, for example, a nonvolatile semiconductor memory or a volatile semiconductor memory to store information indicating the predetermined criteria range for each of the detection coils 43-1 to 43-n, such as the criteria voltage and the allowable voltage change ratio. The storage circuit 70 also stores the predetermined initial setting range used in the calibration process.

The control circuit 71 is an example of a controller, which includes, for example, an arithmetic circuit for determining whether the signal value representing the voltage received from the determiner circuit 69 is within the predetermined initial setting range and a communication circuit for communicating with the power supply circuit 11 in the transmitter device 2.

In the calibration process, the control circuit 71 compares, for each of the detection coils 43-1 to 43-n, the predetermined initial setting range with the voltage output from the detection coil in response to power supplied to the detection coil from the power supply circuit 41 through the feeder coil 42. In response to the voltage output from each of the detection coil being within the predetermined initial setting range, the control circuit 71 stores, into the storage circuit 70, the voltage as the criteria voltage for the detection coil for determining the presence of any foreign object and then ends the calibration process. The control circuit 71 starts the foreign object detection process after the calibration process. For the voltage output from any of the detection coils deviating from the predetermined initial setting range, any foreign object may be already between the transmitter coil 12 and the receiver coil 21 in the calibration process. In this case, the control circuit 71 outputs, to the power supply circuit 11 in the transmitter device 2, a control signal to stop power supply to the transmitter coil 12. The foreign object detector 4 can thus prevent the criteria voltage from being set inappropriately when a foreign object is already present in the calibration process, thus preventing failure to detect any foreign object being present. The foreign object detector 4 can also prevent power from being continuously supplied from the transmitter device 2 to the receiver device 3 in the presence of any foreign object.

The calibration process may be performed when no foreign object is between the transmitter coil 12 and the receiver coil 21. For example, immediately after the start of power supply from the transmitter device 2 to the receiver device 3, no foreign object is expected to be present. In the present embodiment, the control circuit 71 thus outputs, in response to a signal from the power supply circuit 11 in the transmitter device 2 indicating that the power supply to the transmitter coil 12 is started, a control signal to the power supply circuit 41 in the foreign object detector 4 to start supplying power to the feeder coil 42 to cause the foreign object detector 4 to start the calibration process.

Figure 7:
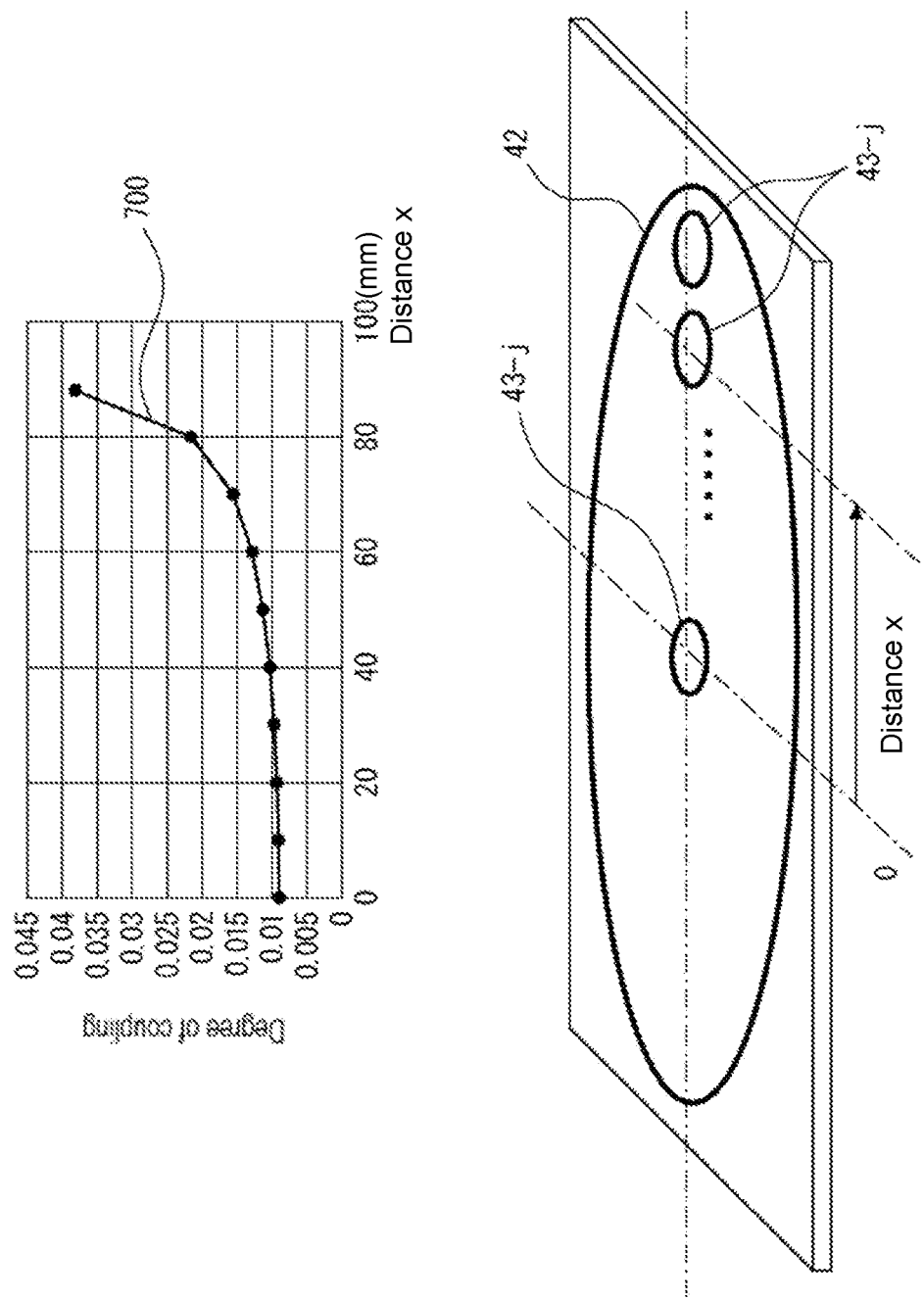
FIG. 7 is a diagram illustrating a relationship between a position of a detection coil relative to a feeder coil and a degree of coupling between the coils.

FIG. 7 is a diagram describing the relationship between the position of a detection coil relative to the feeder coil 42 and their coupling degree. In this example, the feeder coil 42 is substantially circular and has a radius of 100 mm. A detection coil 43-$j$ is substantially circular and has a radius of 10 mm. The horizontal axis of the graph shown in FIG. 7 represents a distance x from the center of the feeder coil 42 to the center of the detection coil 43-$j$ that is moved closer to the feeder coil 42 radially from the center of the feeder coil 42. The vertical axis of the graph shown in FIG. 7 represents the degree of coupling between the feeder coil 42 and the detection coil 43-$j$. A plot 700 represents the relationship between the distance x from the center of the feeder coil 42 to the center of the detection coil 43-$j$ and the coupling degree of the feeder coil 42 and the detection coil 43-$j$. As indicated by the plot 700, the detection coil 43-$j$ more distant from the center of the feeder coil 42, or more specifically, closer to the feeder coil 42 is coupled to the feeder coil 42 at a greater degree. The greater coupling degree increases power supplied from the feeder coil 42 to the detection coil 43-$j$. The greater power supply increases the voltage output from the detection coil 43-$j$ to the detection circuit 45. This indicates that the voltage output from the detection coil 43-$j$ to the detection circuit 45 changes depending on the position of the detection coil 43-$j$ relative to the feeder coil 42.

Figure 8:
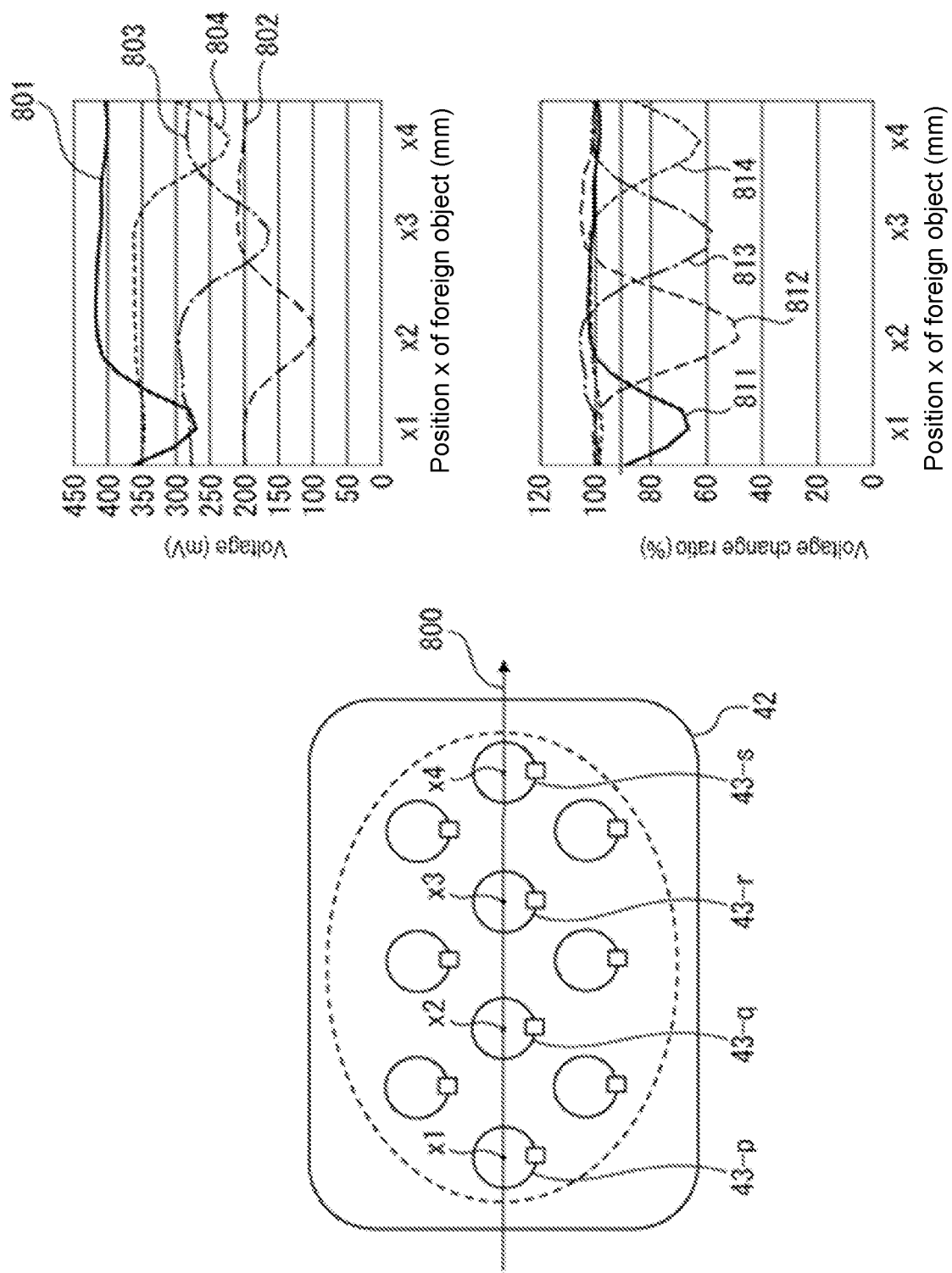
FIG. 8 is a diagram illustrating a measurement results representing a relationships between a position of a foreign object and a voltage output from each detection coil and between the position of the foreign object and a voltage change ratio.

FIG. 8 is a diagram showing the measurement results obtained from experiment, showing the relationships between the position of a foreign object and the voltage output from each detection coil and between the position of the foreign object and the voltage change ratio. The measurement results show the relationship between the output voltage from each detection coil (detection coils 43-$p$, 43-$q$, 43-$r$, and 43-$s$) located on a line 800 and the voltage change ratio for a foreign object moving to different positions along the line 800 extending in a direction including the center of the feeder coil 42.

In each of the upper and lower graphs in FIG. 8, the horizontal axis represents the position of the foreign object along the line 800. The vertical axis of the upper graph represents the output voltage from each detection coil. The vertical axis of the lower graph represents the voltage change ratio. Plots 801 to 804 in the upper graph each represent the relationship between the position of the foreign object and the output voltage from each of the detection coils 43-$p$, 43-$q$, 43-$r$, and 43-$s$. Plots 811 to 814 in the lower graph each represent the relationship between the position of the foreign object and the voltage change ratio calculated for the output voltage from each of the detection coils 43-$p$, 43-$q$, 43-$r$, and 43-$s$. A position x1 is the center of the detection coil 43-$p$, a position x2 is the center of the detection coil 43-$q$, a position x3 is the center of the detection coil 43-$r$, and a position x4 is the center of the detection coil 43-$s$.

The plots 801 to 804 indicate that the output voltage for any of the detection coils decreases as the foreign object moves closer to the detection coil, with the output voltage from the detection coil being minimum when the foreign object is at the center of the detection coil. However, each detection coil is at a different distance from the feeder coil 42 and thus outputs a different output voltage (specifically, the criteria voltage) when the detection coil is distant enough from the foreign object to be unsusceptible to the foreign object. Thus, when the same determination criterion for foreign object detection is used for different detection coils, some detection coils may erroneously detect a foreign object that is not present or may fail to detect a foreign object that is being present.

In contrast, as indicated by the plots 811 to 814, the voltage change ratio does not vary greatly among the detection coils when a foreign object is near the detection coils. Similarly, the voltage change ratio does not vary greatly among the detection coils when the detection coils are distant enough from a foreign object to be unsusceptible to the foreign object. Thus, setting a criteria voltage for each detection coil and determining the presence of a foreign object based on the voltage change ratio allow the foreign object detector 4 to accurately detect any foreign object independently of the relative positional relationship between each detection coil and the feeder coil.

As described above, the foreign object detector includes multiple detection coils on the substrate to be placed between the transmitter coil and the receiver coil that are in a positional relationship in which the transmitter device can transmit power to the receiver device. The foreign object detector supplies AC power to each detection coil through the feeder coil located to be electromagnetically coupled to the detection coils and detects, for each detection coil, the voltage output in response to the supplied AC power with the detection circuit. The foreign object detector determines that a foreign object is between the transmitter coil and the receiver coil in response to the voltage output from any of the detection coils deviating from the predetermined criteria range. The foreign object detector can thus accurately detect any foreign object smaller than the transmitter coil or the receiver coil. The foreign object detector thus has improved detection accuracy of foreign objects. The foreign object detector also sets the voltage output from each detection coil when no foreign object is present as the criteria voltage and determines whether the output voltage is within the predetermined criteria range based on the voltage change ratio, which is the ratio of the voltage output in the foreign object detection process to the criteria voltage. The foreign object detector can thus detect foreign objects accurately independently of the relative positional relationship between each detection coil and feeder coil. Additionally, the foreign object detector eliminates criterion setting for each detection coil for determining the presence of any foreign object, thus involving less complexity in criterion setting for determining the presence of any foreign object. The foreign object detector detects foreign objects using AC power supplied separately from the AC power transmitted from the transmitter device to the receiver device, thus detecting foreign objects without being affected by the power transmission from the transmitter device to the receiver device. In the calibration process, the foreign object detector stops setting the criteria voltage in response to the voltage output from any of the detection coils deviating from a predetermined initial setting range, and stops supplying power to the transmitter coil in the transmitter device. The foreign object detector can thus prevent the criteria voltage from being set inappropriately when a foreign object is already present in the calibration process to cause failure to detect the presence of any foreign object and also prevent power from being supplied continuously from the transmitter device to the receiver device in the presence of any foreign object.

In one modification, the foreign object detector 4 may be attached to the receiver device 3. In this case, the receiver device 3 may further include, in parallel with the receiver coil 21, a switching element (not shown) to switch between shorting or opening the circuit between the two ends of the receiver coil 21 and a control circuit (not shown) to switch the switching element on or off. The signal indicating the detection result of a foreign object from the detection circuit 45 is output to the control circuit in the receiver device 3. In response to the signal indicating detection of a foreign object between the transmitter coil 12 and the receiver coil 21, the control circuit turns on the switching element and shorts the circuit between the two ends of the receiver coil 21. This cuts power transmission from the transmitter device 2 to the receiver device 3, preventing failure resulting from the presence of any foreign object.

As described above, the transmitter device 2 and the receiver device 3 may each include a communicator (not shown) to communicate with each other. In this case, the control circuit in the receiver device 3 may transmit a signal to instruct the transmitter device 2 to stop power transmission through the communicator in response to the signal received from the control circuit 71 in the detection circuit 45 in the foreign object detector 4 indicating detection of a foreign object between the transmitter coil 12 and the receiver coil 21. Upon receiving, through the communicator, the signal instructing the transmitter device 2 to stop power transmission, the control circuit in the power supply circuit 11 in the transmitter device 2 may stop supplying power to the transmitter coil 12 from the power supply circuit 11.

In this modification, the power receiving circuit 23 in the receiver device 3 may include a voltmeter for measuring the voltage output to the load circuit. In this case, the control circuit in the receiver device 3 may output, in response to the voltage measured by the voltmeter remaining at a value less than or equal to a predetermined threshold for a certain period and then exceeding the predetermined threshold, a signal indicating that power transmission from the transmitter device 2 to the receiver device 3 is started, or more specifically, that power for transmission is being supplied to the transmitter coil 12 to the control circuit 71 in the detection circuit 45 in the foreign object detector 4. The control circuit 71 may then output a signal to instruct the power supply circuit 41 in the foreign object detector 4 to start supplying power and start the calibration process. In the calibration process performed by the foreign object detector 4, the control circuit in the receiver device 3 may transfer, in response to a control signal from the control circuit 71 in the detection circuit 45 in the foreign object detector 4 to stop supplying power to the transmitter coil 12 in the transmitter device 2, the control signal to the transmitter device 2 through a communicator. The foreign object detector 4 attached to the receiver device 3 can thus prevent, in the same manner as in the above embodiment, the criteria voltage from being set inappropriately when a foreign object is already present in the calibration process to cause failure to detect the presence of any foreign object and also prevent power from being continuously supplied to the receiver device from the transmitter device in the presence of any foreign object.

The foreign object detector 4 may be attached to each of the transmitter device 2 and the receiver device 3. In other words, two foreign object detectors 4 may be between the transmitter coil 12 and the receiver coil 21.

In another modification, the foreign object detector 4 may further include a remover (not shown) that removes any foreign object between the transmitter coil 12 and the receiver coil 21. In this case, upon detecting any foreign object between the transmitter coil 12 and the receiver coil 21, the detection circuit 45 may activate the remover to remove the foreign object. Such a remover may include, for example, a wiper for wiping the surface of the housing of the transmitter device 2 facing the receiver device 3 or the surface of the housing of the receiver device 3 facing the transmitter device 2 or an air blow gun that blows air between the transmitter device 2 and the receiver device 3 to remove the foreign object. The foreign object detector 4 thus allows power transmission to continue from the transmitter device 2 to the receiver device 3 upon detecting a foreign object and prevents failure of the transmitter device 2 or the receiver device 3 resulting from ignition of the foreign object and heat generated by the foreign object.

As described above, those skilled in the art can make various changes in accordance with embodiments implemented within the scope of the present invention.

The invention claimed is:

1. A foreign object detector, comprising:
a plurality of detection coils at different positions between a transmitter coil in a transmitter device and a receiver coil in a receiver device, the transmitter device being configured to transmit power to the receiver device contactlessly;
a plurality of capacitors each forming a resonant circuit together with a corresponding detection coil of the plurality of detection coils;
a feeder coil located to be electromagnetically coupled to each of the plurality of detection coils;
a power supply circuit configured to supply alternating current power having a predetermined frequency to each of the plurality of detection coils through the feeder coil; and
a detection circuit configured to detect a voltage output from each of the plurality of detection coils in response to the supplied alternating current power and detect a foreign object between the transmitter coil and the receiver coil based on the detected voltage,
wherein the detection circuit comprises
a storage configured to store a criterial voltage for each of the plurality of detection coils,
a controller configured to detect, while power to be transmitted to the receiver coil is being supplied to the transmitter coil, the criterial voltage output from each of the plurality of detection coils at a start of supply of the alternating current power having the predetermined frequency from the power supply circuit, outputs a signal to stop power supply to the transmitter coil in response to the criterial voltage for at least one detection coil of the plurality of detection coils deviating from a predetermined range, and stores the criterial voltage for each of the plurality of detection coils into the storage in response to the criterial voltage for each of the plurality of detection coils being within the predetermined range, and
a determiner configured to determine that a foreign object is between the transmitter coil and the receiver coil in response to a ratio of the detected voltage for at least one detection coil of the plurality of detection coils to the criterial voltage for the at least one detection coil deviating from a predetermined allowable voltage change ratio.

\* \* \* \* \*